"(12) United States Patent" Keiser et al.

(10) Patent No.: US 8,110,163 B2
(45) Date of Patent: Feb. 7, 2012

(54) COMPLEXATION AND REMOVAL OF HEAVY METALS FROM FLUE GAS DESULFURIZATION SYSTEMS

(75) Inventors: Bruce A Keiser, Naperville, IL (US);
Jitendra Shah, Naperville, IL (US);
Anthony G. Sommese, Aurora, IL (US);
Lars E. Capener, Aurora, IL (US);
Peter TenEyck, Wexford, PA (US); Ralf Wysk, Dorsten (DE)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/952,637

(22) Filed: Dec. 7, 2007

(65) Prior Publication Data
US 2009/0148372 A1 Jun. 11, 2009

(51) Int. Cl.
*B01D 53/64* (2006.01)
(52) U.S. Cl. ......... 423/210; 210/729; 210/735; 210/914
(58) Field of Classification Search .................. 423/210; 210/729, 735, 914
See application file for complete search history.

(56) References Cited

U.S. PATENT DOCUMENTS

| | | | |
|---|---|---|---|
| 4,670,180 A * | 6/1987 | Moriya et al. ................. | 252/180 |
| 4,731,187 A | 3/1988 | Moriya et al. | |
| 5,500,133 A | 3/1996 | Carey et al. | |
| 5,658,487 A | 8/1997 | Carey et al. | |

FOREIGN PATENT DOCUMENTS

| | | |
|---|---|---|
| EP | 0 506 132 A1 | 9/1992 |
| JP | 57-91785 A * | 6/1982 |

OTHER PUBLICATIONS

English translation of JP 57-91,785 published Jun. 8, 1982.*
"Mercury Capture and Fate Using Wet FGD at Coal-Fired Power Plants" by C.E. Miller, T.J. Feeley, III; W.W. Aljoe, Bruce W. Lani, Karl T. Schroeder, Candace Kairies, Andrea T. McNemar, Andrew P. Jones, and James T. Murphy, FGD_mercury_2006_NETL.pdf.
"Pilot- and Full-Scale Demonstratin of Advanced Mercury Control Technologies for Lignite-Fired Power Plants", Quarterly Report (Jan. 1, 2004-Mar. 31, 2004), May 2004, NETL 41897Q3.pdf.
"Economics of Lime and Limestone for Control of Sulfer", William DePriest and Rajendra P. Gaikwad, May 2003.
http://www.lime.org/Wet_FGD.pdf. Jan. 2003.
Mercury Control Technologies for Coal-Based Power Plants, Edison Electric Institute, Mercury_Control_Tech.pdf, Aug. 2005.
"Bench-scale Kinetics Study of Mercury Reactions in FGD Liquors", Semiannual Technical Progress Report Apr. 1, 2006-Sep. 30, 2006, by G.M. Blythe and D.W. DeBerry, http://NETL.gov.

* cited by examiner

*Primary Examiner* — Timothy Vanoy
(74) *Attorney, Agent, or Firm* — Edward O. Yonter; Michael B. Martin

(57) ABSTRACT

A method for the reduction of the emission of mercury into the environment from the burning of fossil fuels with the use of polydithiocarbamic compounds. The polydithiocarbamic compounds are used for the capture of mercury from the resulting flue gases using a flue gas desulfrization systems or scrubbers. The method uses polydithiocarbamic compounds in conjunction with a scrubber to capture mercury and reduce its emission and/or re-emission with stack gases. The method is a unique process of reducing the toxic levels of mercury, which allows for the use of coal as a clean and environmentally friendlier fuel source.

25 Claims, No Drawings

COMPLEXATION AND REMOVAL OF HEAVY METALS FROM FLUE GAS DESULFURIZATION SYSTEMS

COPYRIGHT NOTICE

A portion of the disclosure of this patent document contains or may contain copyright protected material. The copyright owner has no objection to the photocopy reproduction by anyone of the patent document or the patent disclosure in exactly the form it appears in the Patent and Trademark Office patent file or records, but otherwise reserves all copyright rights whatsoever.

TECHNICAL FIELD

This invention relates to the reduction of the emission of mercury into the environment from the burning of coal and/or other carbon-based fuels. The invention relates to the method of the capture of mercury from flue gases by flue gas desulfurization systems or scrubbers. The invention demonstrates the method of reducing the toxic levels of mercury, which allows for the use of coal as a clean and environmentally friendlier fuel source.

BACKGROUND

The demand for electricity continues to grow globally. In order to keep stride with the growing demand, coal is being looked to as a source for its generation. At present, burning coal produces some 50% of the electricity generated in the United States. The burning of coal in power generation plants results in the release of energy, as well as the production of solid waste such as bottom and fly ash, and flue gas emissions into the environment. Emissions Standards, as articulated in The Clean Air Act Amendments of 1990 as established by the U.S. Environmental Protection Agency (EPA), requires the assessment of hazardous air pollutants from utility power plants.

The primary gas emissions are criteria pollutants (e.g. sulfur dioxide, nitrogen dioxides, particulate material, and carbon monoxide). About two thirds of all sulfur dioxide and a quarter of the nitrogen dioxide in the atmosphere is attributable to electric power generation achieved by burning coal and other fuels.

Secondary emissions depend on the type of coal or fuel being combusted but include as examples mercury, selenium, arsenic, and boron. Coal-fired utility boilers are known to be a major source of anthropogenic mercury emissions in the United States. In December of 2000, the EPA announced their intention to regulate mercury emissions from coal-fired utility boilers despite the fact that a proven best available technology (BAT) did not exist to capture or control the levels of mercury released by the combustion of coal. This has been further complicated by the lack of quick, reliable, continuous monitoring methods for mercury.

The fact remains that mercury is found in coals at concentrations ranging from 0.02 to 1 ppm. The mercury is present as sulfides, or associated with organic matter. Upon combustion the mercury is released and emitted into the flue gas as gaseous elemental mercury and other mercury compounds. The mercury appears in the flue gas in both the solid and gas phases (particulate-bound mercury and vapor-phase mercury, respectively). The so-called solid phase mercury is really vapor-phase mercury adsorbed onto the surface of ash and/or carbon particles. The solid-phase mercury can be captured by existing particle control devices (PCDs) such as electrostatic precipitators (ESPs) and fabric filters (FF), the latter is sometimes referred to as baghouses.

A review of data collected by the EPA in 1999 under the Mercury Information Collection Request (ICR) showed that PCDs alone could capture from 20 to 42% of the total mercury in the fuel. Of course, the efficiency of this strategy depends on the fuel composition, the operating temperature and design of the PCD. Indeed, it has been found that fabric filters tend to exhibit better particulate laden mercury removal, compared to cold-side ESPs, as a result of the formation of filter cake within the filter. The filter cake contains constituents that absorb and/or adsorb mercury such as unreacted carbon, activated carbon, iron, and fly ash. As such the filter cake can act as a site to facilitate gas-solid reactions between the vapor-phase mercury and the trapped solid particulate. The data suggests FFs can currently achieve as much as 82% mercury capture.

The volatility of mercury and many of its compounds results in a significant portion of the total mercury existing as vapor-phase mercury in the flue gases. Vapor-phase mercury is composed of elemental mercury and oxidized mercury, the relative amounts of these forms being dependent on the amount of chloride in the coal, iron oxide levels in the coal and other constituents in the fly ash as examples. Speciation, which refers to the form of vapor-phase mercury, is a key parameter in development and design of capture strategies for mercury emissions. Generally there are two forms of mercury that constitute vapor-phase mercury. The forms are oxidized ($Hg^{2+}$ as an example) and elemental ($Hg^0$) mercury.

Several control strategies have been developed for the control of mercury emissions from coal-fired boilers. Some of these methods include injection of activated carbon, modified activated carbon, various chemical catalysts, and inorganic sorbents. Unfortunately, none of these strategies removes all the mercury from the flue gas. The efficiencies range from as low as 30% to as high as 80% based on the amount of mercury entering the system with the coal. In addition, these technologies either produce unwanted effects on by-products such as impacting the quality of fly ash, or generate additional waste streams for the power plant. Both lead to higher operational costs for the power plant. One promising strategy is to take advantage of existing air pollution control devices or APCDs to augment or to serve as the primary means to remove vapor-phase mercury. Two examples of APCDs are semi-dry and wet scrubbers or Flue Gas Desulfurizer (FGD). Semi-dry FGDs are also known as Spray Dryer Absorbers or SDAs.

Sulfur oxides ($SO_x$) regulatory compliance mandates the use of at least one of several control strategies. Three such strategies that are used in the US are sorbent injection into the boiler during coal burning and wet or dry Flue Gas Desulfurizers. At present about 3% of the coal-fired power plants are using sorbent injection. FGD scrubbing accounts for 85% using wet and 12% using dry scrubber technologies. Wet scrubbers achieve greater than 90% $SO_x$ removal efficiency compared to 80% by dry scrubbing. In wet scrubbers, the flue gas is brought into contact with slurry containing an alkaline calcium mineral, such as lime or limestone. The $SO_x$ is adsorbed into the water and reacts to form calcium sulfite. It has been demonstrated that simultaneous to $SO_x$ capture, wet FGDs can be used to capture vapor-phase mercury from the flue gas.

Elemental mercury is water insoluble and is not removed by a wet FGD. In contrast, oxidized mercury in the flue gas is water-soluble and is removed. The ICR mercury data demonstrated that ionic mercury is removed effectively approaching 90% by wet FGDs. Hence, one strategy for mercury capture is to oxidize all the mercury during the burning of the coal and capture the oxidized mercury in the wet scrubber. Work carried out by URS in conjunction with DOE/NETL has been investigating just such a strategy. There are two critical technical steps to the implementation of this strategy. The first is the complete oxidation of the vapor-phase mercury exiting the boiler and the coal. URS, among others, is developing strategies and technologies to accomplish this step. To date, they have demonstrated that independent of the coal type, vapor-phase mercury speciation can be shifted to extensively 100% oxidized mercury. The second critical technical step in the implementation of this control strategy is the sorption of the oxidized mercury and removal in the wet scrubber. The problem, identified early on, is that there are reactions occurring in the wet scrubber liquor that reduce oxidized mercury to elemental mercury and lead to "re-emission" or release of elemental mercury into the scrubbed flue gas. The prevention of reduction of ionic mercury in wet scrubber liquor has been studied and reported on by G. M. Blythe and D. W. DeBerry at URS and others.

The findings have suggested that complexation of the ionic mercury is one way to reduce or eliminate the generation of elemental mercury in the scrubber. This same study has demonstrated that not all chelants of ionic mercury can accomplish this in a wet FGD. In a recent presentation, plant results of such a chelant, TMT-15, trimercapto-s-triazine, available from Degussa, were inconclusive regarding the prevention of re-emission of mercury across a wet scrubber. The invention is illustrated by the proceeding descriptions and the following examples which are not meant to limit the invention unless otherwise stated in the claims appended hereto.

Consequently, there remains a need for a technology that can cost-effectively prevent the reduction of ionic mercury in wet scrubbers. The invention described below addresses this need.

DETAILED DESCRIPTION

The present invention documents the use of water-soluble ethylene dichloride ammonia polymer having a molecular weight of from 500 to 10,000, which contains from 5 to 50 mole % of dithiocarbamate salt groups to unexpectedly prevent re-emission of mercury across a wet FGD. The ethylene dichloride-ammonia polymers are prepared by the reaction of ethylene dichloride and ammonia. The starting ethylene dichloride-ammonia polymers generally have a molecular weight range of 500-100,000. In a preferred embodiment the molecular weight is 1,500 to 10,000, with the most preferred molecular weight range being 1,500 to 5,000. The copolymer of this invention is produced using methods presented in U.S. Pat. Nos. 4,731,187, 5,500,133 or 5,658,487 that are examples of said copolymers available for use in the claimed invention. The copolymer is produced by the reaction of the polyamines or polyimines with carbon disulfide to produce polydithiocarbamic acid or their salts. Such reaction is preferably carried out in a solvent such as water or alcohol at a temperature of from 30° and 100° C. for periods of time ranging between 1 and 10 hours. Good conversion is obtained at temperatures between 40° and 70° C. for 2 to 5 hours. These reaction conditions apply to the modification of ethylene dichloride-ammonia polymers described previously.

The mole % of dithiocarbamate salt groups in the finished polymer generally is within the range of 5 to 50%. The preferred range is 20 to 40 mole %, with the most preferred range being about 25 to 30 mole %.

The salts include but are not limited to alkaline and alkali earth such as sodium, lithium, potassium or calcium.

The scrubbers currently used in the industry include spray towers, jet bubblers, and co-current packed towers as examples. These types of APCD are provided as examples and are not meant to represent or suggest any limitation. The water-soluble copolymer may be added to virgin limestone or lime slurry prior to addition to the scrubber, the recirculation loop of the scrubber liquor, the "low solids" return to the scrubber from the scrubber purge stream, or the scrubber liquor.

Typically, the copolymer is applied at a ratio of 1:1 to 2000:1 weight copolymer to weight of mercury being captured. The preferred ratio is from 5:1 to 1000:1 and the most preferred range is from 5:1 to 500:1.

In general the polydithiocarbamic acid compounds may be introduced into the scrubber and thereby into the scrubber liquor via several routes. The following will serve as just some of the variations that are available to introduce the compounds into the scrubber liquor. The scrubber liquor is defined as the water-based dispersion of calcium carbonate (limestone) or calcium oxide (lime) used in a wet Flue Gas Scrubber to capture $SO_x$ emissions. The liquor may also contain other additives such as magnesium and low-molecular weight organic acids, which function to improve sulfur capture. One example of such an additive is a mixture of low-molecular weight organic acids known as dibasic acid (DBA). DBA consists of a blend of adipic, succinic, and glutaric acids. Each of these organic acids can also be used individually. In addition, another low-molecular weight organic acid that can be used to improve sulfur capture in a wet scrubber is formic acid. Finally, the scrubber liquor will also contain byproducts of the interaction between the lime or limestone and sulfur species, which leads to the presence of various amounts of calcium sulfite or calcium sulfate. The scrubber liquor includes but is not limited to the make-up liquor, return liquor, the reclaimed liquor, virgin liquor and liquor injected directly into flue gasses.

Another addition point for the polydithiocarbamic compounds of this invention to the wet scrubber is via the "low solids" liquor return. A portion of the liquor is usually continuously removed from the scrubber for the purpose of separating reaction byproducts from unused lime or limestone. One means of separation that is currently used is centrifugation. In this process the scrubber liquor is separated into a "high solids" and "low solids" stream. The high solids stream is diverted to wastewater processing. The low solids fraction returns to the wet scrubber and can be considered "reclaimed" dilute liquor. The polydithiocarbamic acid compounds of this invention can conveniently be added to the reclaimed low solids stream prior to returning to the scrubber.

Another feed liquor found in the operation of a wet FGD is called "virgin liquor". Virgin liquor is the water-based dispersion of either lime or limestone prior to exposure to flue gas and is used to added fresh lime or limestone while maintaining the scrubber liquor level and efficiency of the wet FGD. This is prepared by dispersing the lime or limestone in water. Here the polydithiocarbamic acid compounds can be added either to the dispersion water or the virgin liquor directly.

Finally, some wet scrubber installations use scrubber liquor and/or water (fresh or recycled) injected directly into the flue gas prior to the scrubber for the purpose of controlling relative humidity of the flue gas or its temperature. The excess liquid is then carried into the wet scrubber. Here also are two potential addition points for the introduction of the polydithiocarbamic acid compounds of the present invention.

The addition of the polydithiocarbamic acid compounds can be made in any of these locations, wholly or fractionally (i.e. a single feed point or multiple feed points), including but not limited to the make-up water for the lime or limestone slurry or the scrubber liquor.

The invention is illustrated by the proceeding descriptions and the following examples which are not meant to limit the invention unless otherwise stated in the claims appended hereto.

EXAMPLES

The foregoing may be better understood by reference to the following examples, which are intended to illustrate methods for carrying out the invention and are not intended to limit the scope of the invention.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

Example 1

A sample of scrubber water that was treated by vacuum filter. The objective was to remove mercury. The sample was investigated for mercury removal using design of experiments with two variables pH and dosage.

The results showed that mercury levels of less than 0.5 ppb in the treated water was achieved at various pHs at a reasonable product dosages. This work demonstrated that the product did achieve mercury capture from wet FGD liquors. The lower detection limit of the analytical method was 0.5 ppb.

The results are as follows:

| Number | Sample Name | DTCP[a] (ppm) | Flocculant[b] (ppm) | Total Hg content (ppb) | Dissolved Hg content (ppb) |
|---|---|---|---|---|---|
| 60 | blank as recd (pH = 6) | 0 | 0 | 22.3 | 17.2 |
| 61 | | 10 | 2 | <0.5 | <0.5 |
| 62 | | 20 | 2 | <0.5 | <0.5 |
| 63 | | 30 | 2 | <0.5 | <0.5 |
| 65 | | 50 | 2 | <0.5 | <0.5 |
| 67 | | 70 | 2 | <0.5 | <0.5 |
| 610 | | 100 | 2 | <0.5 | <0.5 |
| 70 | pH 7.1 adj w lime | 0 | 0 | 11.3 | 6.2 |
| 71 | | 10 | 2 | 1.6 | 0.5 |
| 72 | | 20 | 2 | 1.3 | <0.5 |
| 73 | | 30 | 2 | <0.5 | <0.5 |
| 75 | | 50 | 2 | <0.5 | <0.5 |
| 710 | | 100 | 2 | <0.5 | <0.5 |
| 80 | pH 8 adj w lime | 0 | 0 | 6.0 | 5.1 |
| 81 | | 10 | 2 | 1.2 | 0.5 |
| 82 | | 20 | 2 | <0.5 | <0.5 |
| 83 | | 30 | 2 | <0.5 | <0.5 |
| 84 | | 40 | 2 | <0.5 | <0.5 |
| 85 | | 50 | 2 | <0.5 | <0.5 |
| 810 | | 100 | 2 | <0.5 | <0.5 |

[a]DTCP is a polydithiocarbamic compound of the present invention
[b]Flocculant is commercially available from Nalco Company and is a very high molecular, 30 mole % anionic latex polymer.

Example 2

A 2 L solution was prepared by dissolving 6.7 mg of sodium selenite, $Na_2SeO_3.5H_2O$, 14 mL of 0.141M $Hg(NO_3)_2$ and 18.4 g of calcium chloride, $CaCl_2.2H_2O$. The resulting solution had measured concentrations of 0.037 mM selenium, 1.04 µM mercury and 63 mM calcium chloride dehydrate.

The results are shown in the table below.

| Treatment | Amt (gm/500 mL) | Hg (µg/L) | % Removed |
|---|---|---|---|
| Fly Ash | 8.04 | 202 | 3.35 |
| Zeolite | 7.99 | 213 | 0.00 |

The zeolite was a spent commercial catalyst. The fly ash sample was obtained from a coal-fired power plant. The fly ash sample was composed of 93% ash content with 6% residual carbon and 1% residual sulfur. These results clearly show that neither fly ash nor zeolites significantly reduce the ionic mercury content.

Example 3

A synthetic FGD scrubber liquor was prepared by dissolving 12.58 g of calcium chloride dihydrate, $CaCl_2.2H_2O$, in 400 mL of deionized water. The resulting solution was 214 mM in calcium chloride dihydrate leading to 15,000 ppm chloride and 8560 ppm calcium in solution. The solution was split into two equal portions. To 200 mL of solution was added 164 µL of 0.61 mM mercury nitrate solution to yield a solution containing 130 µg/L of ionic mercury. This solution was treated with 27.4 g of calcium sulfate dihydrate or 18 weight percent. The solution was mixed and split into two portions. The smaller portion, 75 g total, was treated with the polydithiocarbamic acid compound at a 5:1 product to mercury weight ratio. The polydithiocarbamic acid compound product was a 30% active water miscible solution. The two portions were agitated separately with a magnetic stir bar for 12 hours. After which time, the suspension was filtered using a Pall Life Sciences GN-6 Metricel 0.45µ membrane filter (P/N 63069). The filtrate was analyzed for mercury.

A second portion, 200 g, of calcium chloride dihydrate solution was treated with 82 µL of 0.61 mM mercuric nitrate solution to yield a solution containing 78.3 µg of ionic mercury. Again this solution was treated with 27.4 g of calcium sulfate, dihydrate to yield a slurry containing 18% by weight. As before, this sample was split into two solutions, the minor portion, 75 g, was treated with the polydithiocarbamic acid compound product at a 5:1 product weight to mercury weight ratio. After further mixing for 12 hours using a magnetic stir bar, the dispersions were filtered using a Pall Life Sciences GN-6 Metricel 0.45µ membrane filter (P/N 63069). The filtrate was analyzed for mercury.

The results are shown below.

| Description | Mercury (µ/L) | % Removal |
|---|---|---|
| High Mercury content, blank | 130 | |
| High Mercury with gypsum | 130 | 0.00% |
| High Mercury with gypsum and copolymer of invention | <0.10 | >99.9% |
| Low Mercury, blank | 78.3 | |
| Low Mercury with gypsum | 74.7 | |
| Low Mercury with gypsum and copolymer of invention | <0.10 | >99.9% |

It is clear from this example that the polydithiocarbamic acid compound of this invention removes the ionic mercury from the liquid phase. The gypsum solids for the above samples were submitted for TGA (Thermogravimetric Analysis) in order to observe any decomposition or release of mercury. All the thermographs were identical exhibiting only the loss of associated and bound water between room temperature and 170° C. Above this temperature no further decomposition could be observed. This indicates that once the complex is formed, it does not decompose under normal FGD scrubber operation.

Example 4

A general stock solution was prepared containing 0.214M calcium chloride dihydrate by dissolving 220 g of $CaCl_2 \cdot 2H_2O$ in 7 L of deionized water. To this was added 74 µL of 61 mM mercury nitrate solution to yield a solution containing 136 µg/L. This solution was divided into two portions. The first portion was mixed with enough calcium sulfate dihydrate to yield slurry at 18% by weight-dispersed solids. The second portion was mixed with enough calcium sulfate dihydrate to yield a 21% by weight slurry.

Organic acids are used in many wet FGD scrubbers to improve the $SO_x$ removal efficiency as well as the limestone or lime utilization. In most cases, a by-product stream known in the industry as Dibasic Acid or DBA is the product of choice. DBA is a mixture of adipic acid (aka hexanedioic acid), succinic acid (aka butanedioic acid) and glutaric acid (aka pentaedioic acid). For the purposes of this example, a "synthetic" DBA was prepared using an equal molar ratio of adipic and succinic acids. The adipic acid can be obtained from Mallinckrodt Chemicals, Cat No. MK180159. The succinic acid can be obtained from J. T. Baker, reagent grade, Cat. No. JT0346-5. The solutions were spiked with the equal molar ratio acids to produce 332 and 100 ppm total acid concentrations.

The polydithiocarbamic acid compound of the current invention was added at a product to mercury weight ratio of 4.5:1 and 1:1 respectively with or without the synthetic DBA present in the slurry. The order of addition was kept to the following: synthetic DBA then the polydithiocarbamic acid compound of this invention. Once the various additives have been introduced into the slurry, it is mixed for an additional 15 to 20 minutes with a magnetic stir bar. After this time, the slurry is filtered using a Pall Life Sciences GN-6 Metricel 0.45% membrane filter (P/N 63069). The filtrate is subsequently analyzed.

The results are shown in the table below:

| Description | DBA Type | DBA Dose(ppm) | Additive Type | Additive ratio | Hg µg/L |
|---|---|---|---|---|---|
| water | | | | | 136 |
| 18% Gypsum | | | | | 121 |
| 18% Gypsum | | | DTCP | 0.91 | <0.5 |
| 18% Gypsum | | | DTCP | 4.5 | <0.5 |
| 18% Gypsum | Syn DBA | 332 | | | 75.7 |
| 18% Gypsum | Syn DBA | 332 | DTCP | 0.91 | <0.5 |
| 18% Gypsum | Syn DBA | 332 | DTCP | 0.91 | <0.5 |
| 18% Gypsum | Syn DBA | 332 | DTCP | 4.5 | <0.5 |
| 18% Gypsum | Syn DBA | 100 | | | 81.2 |
| 18% Gypsum | Syn DBA | 100 | DTCP | 0.91 | <0.5 |
| 18% Gypsum | Syn DBA | 100 | DTCP | 4.5 | <0.5 |
| 20.7% Gypsum | | | | | 83.5 |
| 20.7% Gypsum | | | DTCP | 0.91 | <0.5 |
| 20.7% Gypsum | | | DTCP | 4.5 | <0.5 |
| 20.7% Gypsum | Syn DBA | 332 | | | 80.3 |
| 20.7% Gypsum | Syn DBA | 332 | DTCP | 0.91 | <0.5 |
| 20.7% Gypsum | Syn DBA | 332 | DTCP | 0.91 | <0.5 |
| 20.7% Gypsum | Syn DBA | 332 | DTCP | 4.5 | 0.9 |

DTCP is the polydithiocarbamic acid compound of this invention. See above for the definition of synthetic DBA, aka "Syn DBA".

The results in the table above clearly show that the presence of organic acids in the scrubber liquor does not interfere with the performance of the polydithiocarbamic acid compound of this invention regarding complexing mercury in the liquid phase. The results also confirm that the copolymer interacts with and removes ionic mercury from the liquid phase to below 500 parts per trillion.

Example 5

Three additives were tested in a bench-scale wet scrubber with a gas flow of 1-cfm. One additive, TMT-15 is currently used to control mercury emissions from incinerators. The polydithiocarbamic acid compound, sodium salt used is an embodiment of the claimed invention.

The bench-scale unit allows for the use of a simulated flue gas composed of $SO_2$, $NO_x$, HCl, $CO_2$, oxygen and nitrogen. Moisture is controlled by exposing a portion of the oxygen, carbon dioxide, and nitrogen to water saturators. The flue gas composition used in the study consisted of 15-25 µg/Nm³ $HgCl_2$, 12% $CO_2$, 3% $O_2$, 1000 ppm $SO_2$, 15 ppm HCl, no $NO_x$, the balance nitrogen. The flow rate was 28 L/min. The sorbent solution or scrubber liquor was maintained at a temperature of 55° C. and consisted of 100 mM sodium chloride, and 10 mM sodium sulfate (initial concentration) with a pH of 5.0. The sulfite concentration was controlled at 5 mM by the addition of hydrogen peroxide to the sorbent solution. The pH of the scrubber liquor was maintained by the addition of NaOH. In each case, the appropriate amount of additive was introduced into the scrubber liquor just prior to the injection of 0.5 µM $HgCl_2$ as a solution of 0.5 mM $HgCl_2$ and after the system had reached equilibrium.

The bench-scale scrubber uses a bubbler type gas contactor. The gas contact vessel sits on top of the scrubber liquor reaction vessel so that the liquor returns to the reactor vessel via gravity drainage. The liquor is recirculated into the scrubber via a recirculation pump to maintain a constant liquid/gas ratio. The pH is monitored both in the scrubber and in the reaction vessel. The pH of the reaction vessel is maintained by addition of sodium hydroxide solution. The reaction vessel is mixed via magnetic stirring. A flow-through cell and spectrophotometer was used to monitor sulfite concentration in the scrubber liquor via a modification of a method reported by M. W. Scoggins, Analytical Chemistry, 42(9), 1091 (1970). The results were used to automatically control the addition of hydrogen peroxide so as to maintain the target sulfite concentration. Oxidized mercury is added to the gas by passing a portion of the dry nitrogen gas through a mercury diffusion cell. About 5% of the total mercury introduced in this way was elemental. Two separate CVAAS (Cold Vapor Atomic Adsorption Spectroscopy) instruments monitored respectfully the flue gas inlet and the scrubber outlet. The mercury re-emissions were calculated as follows:

Average re-emission=[average elemental Hg outlet]−[average elemental Hg inlet]

The results are shown in the table below:

| Additive | Hg re-emissions, μg/Nm$^3$ |
|---|---|
| None | 2.05 |
| 0.05 mM TMT-15 | 1.70 |
| 0.022 mM DEDTC[b] with 15 mM Ca$^{+2}$ | 1.05 |
| 0.05 mM Polydithiocarbamic acid, sodium salt | <0.01 |

[b]diethyldithiocarbamate, sodium salt

It is clear from these bench-scale results that the polydithiocarbamic acid compound of the current invention successfully controls the re-emission of mercury from a wet FGD and does so more efficiently than the current art.

We claim:

1. A method for preventing the re-emission of mercury in a flue gas wet scrubber process, the method comprising:
   burning coal, thereby producing a flue gas; and
   passing the flue gas into the flue gas wet scrubber process comprising a scrubber liquor and a polydithiocarbamic compound of one or more polythiocarbamic materials.

2. The method of claim 1 wherein the polydithiocarbamic compound is water soluble.

3. The method of claim 1 wherein the polydithiocarbamic compound contains 5 to 50 mole percent of diothiocarbamate salt groups.

4. The method of claim 1 wherein the polydithiocarbamic compound contains 15 to 50 mole percent of dithiocarbamate salt groups.

5. The method of claim 1 wherein the polydiothiocarbamic compound contains 25 to 40 mole percent of dithiocarbamate salt groups.

6. The method of claim 1 wherein the polydithiocarbamic compound has a molecular weight of 500 to 100,000.

7. The method of claim 1 wherein the polydithiocarbamic compound has a molecular weight of 1,500 to 10,000.

8. The method of claim 1 wherein the polydithiocarbamic compound has a molecular weight of 1,500 to 5,000.

9. The method of claim 2 wherein the slurry is water-based.

10. The method of claim 1 wherein the scrubber is a spray tower system.

11. The method of claim 1 wherein the scrubber is a jet bubblers system.

12. The method of claim 1 wherein the scrubber is a co-current packed tower system.

13. The method of claim 1 wherein the polydithiocarbamic compound is added to the system in a weight ratio of 1:1 to 2000:1 in relation to the mercury content.

14. The method of claim 1 wherein the polydithiocarbamic compound is added to the system in a weight ratio of 5:1 to 500:1 in relation to the mercury content.

15. The method of claim 1 wherein the polydithiocarbamic compound is added to the slurry and then added to the scrubber.

16. The method of claim 1 wherein the polydithiocarbamic compound is added to the scrubber containing the slurry.

17. The method of claim 1 wherein the polydithiocarbamic compound is added to the virgin liquor then added to the scrubber.

18. The method of claim 1 wherein the polydithiocarbamic compound is added to a make-up liquor then added to the scrubber.

19. The method of claim 1 wherein the polydithiocarbamic compound is added to a return liquor then added to the scrubber.

20. The method of claim 1 wherein the polydithiocarbamic compound is added to a reclaimed liquor then added to the scrubber.

21. The method of claim 1 wherein the polydithiocarbamic compound is added to a liquor injected directed into flue gases then added to the scrubber.

22. The method of claim 1 wherein the polydithiocarbamic compound is added to a lime slurry then added to the scrubber.

23. The method of claim 1 wherein the polydithiocarbamic compound with dithiocarbamate salt groups is added to a recirculation loop of the scrubber liquor.

24. The method of claim 1 wherein the polydithiocarbamic compound with dithiocarbamate salt groups is added to a low solids return to the scrubber from the scrubber purge stream.

25. The method of claim 1, wherein the flue gas wet scrubber process comprises a wet flue gas desulfurizer process.

* * * * *